June 24, 1924.

L. F. NAFIS

MILK TESTING VESSEL

Filed Dec. 17, 1921

1,499,188

Witness:
A. A. Brand

Inventor,
Louis F. Nafis
By Jones, Addington, Ames & Seibold
Attys

Patented June 24, 1924.

1,499,188

UNITED STATES PATENT OFFICE.

LOUIS F. NAFIS, OF CHICAGO, ILLINOIS.

MILK-TESTING VESSEL.

Application filed December 17, 1921. Serial No. 523,227.

*To all whom it may concern:*

Be it known that I, LOUIS F. NAFIS, a citizen of the United States, residing at Chicago, in the county of Cook and State of Illinois, have invented new and useful Improvements in Milk-Testing Vessels, of which the following is a full, clear, concise, and exact description, reference being had to the accompanying drawing, forming a part of this specification.

This invention relates to a milk-testing vessel, wherein the fat content of milk, cream, etc., is to be determined.

More particularly the invention contemplates the provision of a testing vessel of such a character that it is not constantly subject to breakage in ordinary usage, that is convenient in use and is easy to keep clean.

It is usual in testing milk by the Babcock process to mix a pre-determined quantity of milk with an acid such as sulphuric acid, whereby the solid constituents of the milk—other than the butter fat—are dissolved, and the butter fat separates from the remainder of the mixture. Hot water is then added to cause the fatty part of the milk to rise in a tube whereby measurement of the same is effected. The above separation and consequent rising of the fat into the measuring tube is usually hastened by placing the vessel into a machine whereby it is whirled, the centrifugal force causing the separation and entrance of the fat into the measuring tube to take place in a relatively short time.

Obviously the uneven heating of the walls of the glass vessel by the reaction due to the sulphuric acid coming in contact with the water in the milk and the heating by the hot water or steam in the centrifugal machine, as well as the whirling of the bottles at a high rate of speed in the machine, subjects them to various strains tending to cause breakage, and this is particularly troublesome in the case of glass bottles or vessels having abrupt shoulders forming restricted portions in the length thereof. One of the most convenient testing bottles for use in the above process is of the type wherein a restricted portion acts as a support for a measuring tube, but its use has been practically discontinued because of the frequency with which it broke at the restricted points.

The advantages resultant from the present invention and the manner in which the above breakage difficulty is avoided will be more readily understood upon a reading of the accompanying description, taken in connection with the drawings; in which—

Figure 1:
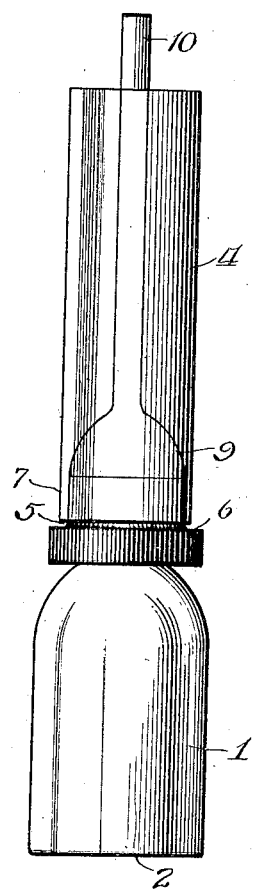
Figure 2:
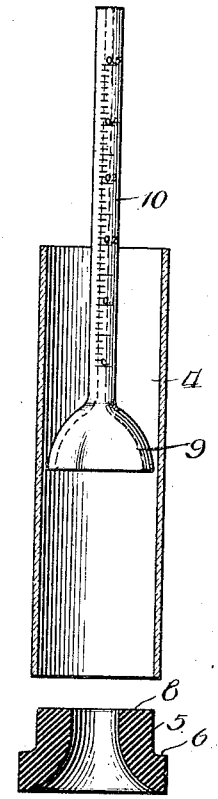
Figure 2:
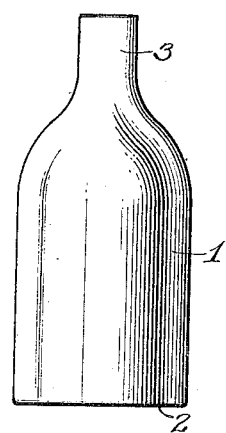

Fig. 1 is an elevational view of a milk testing vessel embodying the invention; and Fig. 2 is an elevational view, partially in section,—and with the parts separated,—of the device shown in Fig. 1.

Referring now more particularly to the drawing, the testing vessel comprises two compartments, one being a bottle 1 having a closed bottom 2 and a restricted neck portion 3, and the other an open ended cylindrical member 4. It will of course be understood that these parts or compartments are of glass whereby the contents thereof may be readily observed.

A collar member 5 is formed of non-frangible material, preferably rubber or some acid and heat resisting compound, and is adapted to be seated closely over the restricted neck portion 3 of the body or bottle 1. An annular shoulder 6 is formed on the exterior of this rubber collar and is adapted to receive the lower end of the glass jacket or member 4. Since the collar is close fitting and preferably resilient the joinder of the elements 1 and 4 by the collar 5 produces a fluid tight vessel, having the two compartments, the neck 3 of the bottle 1 serving as the passage therebetween for whatever material may be forced or passed therethrough.

When the two members are joined by the collar, as shown in Fig. 1, the upper portion 7 of the said collar forms an interior annular shoulder 8, upon which may rest the open bell shaped bottom portion 9 of a graduated measuring tube 10. The opening through this tube 10 may be of any desired size according to the material to be tested, as is well understood in the art, and the same vessel throughout except for a change of tubes 10, may be used for testing the different materials, such as milk, cream, butter, etc.

In use, the milk is introduced into the bottle 1, and then the acid. The collar 5, glass jacket 4 and graduated tube 10 are then placed in position as shown in Fig. 1, and hot water is poured into the jacket 4. The water passes beneath the bottom 9 of the tube 10, down into the body portion 1, the engaging surfaces of the bottom edge of the tube part 9 and the top of the rubber collar 5 being sufficiently uneven to permit this, and causes the fat to rise in the graduated tube 10 where it may be measured by the graduations on the tube.

This latter action is facilitated by placing the device in a centrifugal machine and operating the same. This machine ordinarily receives and supports the vessels in a vertical position when at rest but swings their lower ends outwardly until the vessels are in a substantially horizontal position when being rapidly whirled.

In this whirling action mechanical strains are set up in the vessels particularly about their midsections, and hot water, steam or electricity may be employed in the machine to keep the vessels and contents hot, all of which tends to fracture the vessels about their reduced portions if made wholly of glass. There is in addition the heat generated quickly by the chemical reaction between the acid and the water in the milk. By making the vessel of the two sections, however, joined by an intermediate section of non-frangible and more or less flexible material, the fracture of the vessels at the restricted portions is avoided.

The seating of the lower end of tube 10 on the rubber instead of on glass also lessens the liability of breakage.

Another decided advantage which is obtained through the use of this invention is the ready accessibility to the interiors of the two compartments, permitting the cleansing of the same. Those skilled in the art will readily recognize that the cleansing of a test bottle having the form shown, or similar thereto, assuming that the compartments are formed integrally with each other, is almost an impossibility. This follows because, as the vessel is made with a restricted portion formed therein to support the bottom of the tube 9, both sides, and particularly the underside, of this restricted portion are more or less inaccessible, and difficult to clean. This invention, therefore, provides a milk-testing vessel wherein the possibility of breakage has been reduced to a minimum, and wherein the parts can be readily cleaned. It will of course be understood that the two compartments may be separated from each other and from the collar member by detaching the various portions from each other, this being comparatively easy since the collar member is resilient in character. Although the ready separation of the parts is possible, they are made so that the junction of the two compartments will be liquid tight. In case of the breakage of any of the individual parts by rough handling or otherwise, they can be replaced at less expense than in the case of ordinary bottles where the parts are integral.

While but one embodiment of the invention is described, it is believed that it is entirely novel to construct vessels of this character with a restricted portion of material of the class described, and it is desired, therefore, that said invention be broadly interpreted and limited only by the showing of the prior art and by the scope of the appended claims.

What is claimed as new and desired to be secured by Letters Patent is:

1. A milk-testing vessel comprising two separable compartments, non-frangible means uniting said compartments, and a measuring tube within one of said compartments and communicative with the other of said compartments.

2. A milk testing vessel comprising a glass bottle provided with a neck, a non-frangible collar seated on said neck, another glass member fitted on said collar, said collar forming a shoulder within said second glass member, and a measuring tube resting on said shoulder.

3. A milk-testing vessel comprising two compartments, one compartment being closed at its lower end, and a separate member for partially closing the lower end of the other compartment and for joining said compartments together.

4. A milk-testing vessel comprising two compartments, one compartment being closed at its lower end, and means comprising a resilient member adapted to fit over the top of one compartment and to receive the lower open end of the other compartment.

5. A milk-testing vessel comprising a compartment for containing the sample to be tested, an additional separable compartment surmounting said first named compartment, separable uniting means for forming a restricted portion between the two compartments, and a measuring tube communicative with said first named compartment.

6. A milk-testing vessel comprising two compartments the major portions of which have cross-sectional areas of similar magnitude, and means separably receiving each compartment for forming a restricted portion between the two compartments.

7. A milk-testing vessel comprising two compartments, non-frangible means for forming a restricted portion between the two compartments, and for uniting the latter, and a measuring tube within one of said compartments.

8. A milk-testing cylindrical vessel comprising two compartments, the major portions of which have cross-sectional areas of similar magnitude, and resilient means for forming a restricted portion between the two compartments, and for uniting the latter.

9. A milk-testing vessel having a closed bottom, means forming an interior annular shoulder of non-frangible material in asid vessel, and a measuring tube resting on said shoulder.

10. A milk-testing vessel having a closed bottom, a bottle shaped tube having its base extending into said vessel, and an interior annular shoulder in said vessel to receive said base, said shoulder portion being of resilient material to reduce the breakage factor of said tube to substantially zero.

11. A milk-testing vessel comprising a lower portion having a closed bottom and a restricted neck, a collar member adapted to fit over said neck, and an open ended cylindrical upper portion seated on said collar and jointed thereby to said first portion.

12. A milk-testing vessel comprising a lower part having a closed bottom and a restricted neck portion, a collar member adapted to fit over said neck, an annular shoulder formed on said collar, and an open ended cylindrical part seated on said shoulder, said collar being of resilient, non-frangible material.

13. A milk-testing cylindrical vessel comprising two compartments, means for forming a resilient restricted portion between the two compartments, and a measuring tube adapted to rest on said resilient restricted portion.

14. A milk-testing vessel comprising two separable compartments, a resilient, non-frangible collar for joining said compartments, and a measuring tube within one of said compartments.

15. A milk-testing vessel comprising two compartments, and a resilient, non-frangible collar for joining said compartments, said collar forming an interior annular shoulder at the bottom of one compartment, and a measuring tube adapted to be supported by said shoulder.

16. A milk-testing vessel comprising a lower glass bottle having a restricted neck, a rubber collar fitted on the outside of said neck, a cylindrical glass member fitted on the outside of said collar, and a glass measuring tube having a flaring lower end adapted to rest on the upper edge of said collar within the said cylinder.

In witness whereof, I have hereunto subscribed my name.

LOUIS F. NAFIS.